United States Patent
Watanabe et al.

(10) Patent No.: US 10,221,734 B2
(45) Date of Patent: Mar. 5, 2019

(54) LUBRICATION STRUCTURE AND LUBRICATION METHOD FOR UPPER PIN IN PISTON CRANK MECHANISM OF INTERNAL COMBUSTION ENGINE

(71) Applicant: NISSAN MOTOR CO., LTD., Yokohama-shi, Kanagawa (JP)

(72) Inventors: Daisuke Watanabe, Kanagawa (JP); Shigeru Nakajima, Kanagawa (JP); Kazuto Waki, Kanagawa (JP); Yoshihiro Kobayashi, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/757,100

(22) PCT Filed: Sep. 4, 2015

(86) PCT No.: PCT/JP2015/075169
§ 371 (c)(1),
(2) Date: Mar. 2, 2018

(87) PCT Pub. No.: WO2017/037935
PCT Pub. Date: Mar. 9, 2017

(65) Prior Publication Data
US 2018/0171839 A1     Jun. 21, 2018

(51) Int. Cl.
*F01M 11/02*     (2006.01)
*F01M 1/00*      (2006.01)
(Continued)

(52) U.S. Cl.
CPC ............. *F01M 11/02* (2013.01); *F01M 1/00* (2013.01); *F02B 75/045* (2013.01); *F16C 3/14* (2013.01);
(Continued)

(58) Field of Classification Search
CPC ...... F01M 1/08; F01M 1/06; F01M 2001/066; F01M 2001/086; F01M 11/02;
(Continued)

(56) References Cited

U.S. PATENT DOCUMENTS

| 9,856,907 B2 | 1/2018 | Tanabe et al. |
| 2002/0043228 A1* | 4/2002 | Moteki ................ F02B 75/045 123/78 E |

(Continued)

FOREIGN PATENT DOCUMENTS

| JP | 2002-364393 A | 12/2002 |
| JP | 2008-208783 A | 9/2008 |

(Continued)

*Primary Examiner* — Syed O Hasan
(74) *Attorney, Agent, or Firm* — Foley & Lardner LLP

(57) ABSTRACT

A lubrication structure of the present invention is applied to a multi-link piston crank mechanism that has a upper link (3), a lower link (6) and a control link (7). Lubricating oil is supplied in an oil storing portion (21) formed between a pair of upper-pin pin boss portions (12) by a plate member (22) through an oil supply hole (19). By oscillating rotary motion of the upper link side pin boss portion (25) that is provided with an oil groove (29) on an end surface of the upper link side pin boss portion (25), the lubricating oil in the oil storing portion (21) is supplied to an upper pin (4).

7 Claims, 8 Drawing Sheets

(51) Int. Cl.
  *F02B 75/04* (2006.01)
  *F16C 3/14* (2006.01)
  *F16C 33/10* (2006.01)
  *F02B 75/32* (2006.01)

(52) U.S. Cl.
  CPC .... *F16C 33/1055* (2013.01); *F01M 2011/027* (2013.01); *F02B 75/32* (2013.01)

(58) Field of Classification Search
  CPC ....... F01M 1/00; F01P 3/08; F01P 7/14; F01P 2007/146; F02B 75/04; F02B 75/048; F02B 75/045; F02D 15/02; F16C 3/14; F16C 33/1055
  USPC ....................................................... 123/48 B
  See application file for complete search history.

(56) References Cited

U.S. PATENT DOCUMENTS

| | | |
|---|---|---|
| 2002/0144665 A1 | 10/2002 | Ushijima et al. |
| 2009/0288643 A1 | 11/2009 | Kono et al. |
| 2010/0050992 A1* | 3/2010 | Nakanishi ............. F02B 75/048 123/48 B |
| 2012/0111143 A1* | 5/2012 | Tanabe ...................... F16C 3/14 74/602 |
| 2013/0208662 A1* | 8/2013 | Lee ....................... H04W 24/10 370/328 |
| 2016/0138467 A1* | 5/2016 | Hoshikawa ............. F02B 75/32 123/48 B |

FOREIGN PATENT DOCUMENTS

| | | |
|---|---|---|
| JP | 2009-281242 A | 12/2009 |
| JP | 2010-7620 A | 1/2010 |
| JP | 2010-185328 A | 8/2010 |
| JP | 2010-185329 A | 8/2010 |
| JP | 2010-203270 A | 9/2010 |
| JP | 2012-26384 A | 2/2012 |
| WO | 2011-007622 A1 | 1/2011 |
| WO | WO 2014/027488 A1 | 2/2014 |
| WO | WO 2015/025683 A1 | 2/2015 |

\* cited by examiner

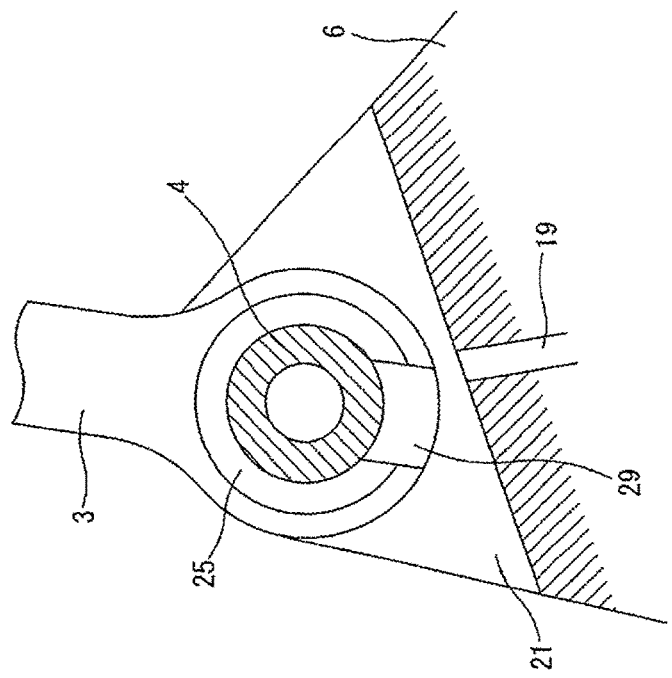
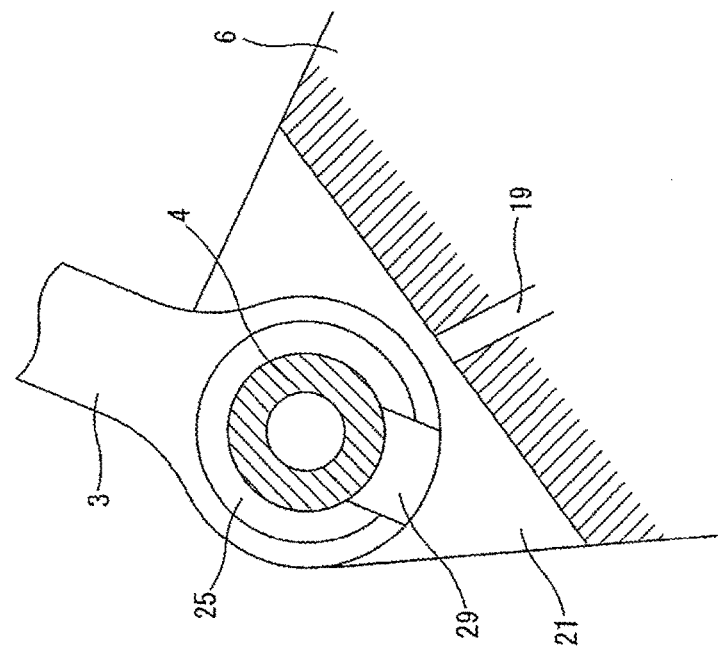

LUBRICATION STRUCTURE AND LUBRICATION METHOD FOR UPPER PIN IN PISTON CRANK MECHANISM OF INTERNAL COMBUSTION ENGINE

The present invention relates to a multi-link piston crank mechanism of an internal combustion engine, and more particularly to a lubrication structure and a lubrication method of an upper pin that connects a lower link and an upper link.

BACKGROUND ART

As a related art technique in which a piston pin and a crank pin of a reciprocating internal combustion engine are connected by a multi-link piston crank mechanism, Patent Document 1 which applicant of the present invention have proposed is known. The multi-link piston crank mechanism has an upper link which is connected to the piston pin of a piston, a lower link which connects this upper link and the crank pin of a crank shaft, and a control link whose one end is rockably supported at an engine body side and whose other end is connected to the lower link. The upper link and the lower link are rotatably (pivotably) connected through an upper pin. The control link and the lower link are rotatably (pivotably) connected through a control pin.

Regarding the upper pin in such multi-link piston crank mechanism, both end portions of the upper pin are supported at a pair of upper-pin pin boss portions formed at one end of the lower link and having a bifurcated shape, and a cylindrical upper link side pin boss portion of an end portion of the upper link is rotatably (pivotably) fitted or connected to a middle portion in an axial direction of the upper pin.

Patent Document 1 discloses a lubrication structure in which an oil hole is formed at a lower portion of the upper link side pin boss portion so as to penetrate the lower portion along a radial direction, and a part of lubricating oil injected from an oil jet that is disposed at a lower side with respect to the crank shaft is taken in from the oil hole, then the upper pin is lubricated.

In a case of the lubrication structure of Patent Document 1, however, the lubricating oil is supplied only for a limited time period when an injection direction of the oil jet is identical with the oil hole in a state in which the lower link is rocking. It is therefore difficult to continuously supply the lubricating oil to the upper pin.

CITATION LIST

Patent Document

Patent Document 1 : Japanese Unexamined Patent Application Publication No. 2010-007620

SUMMARY OF THE INVENTION

In the present invention, a piston crank mechanism includes: an upper link whose one end is connected to a piston through a piston pin; a lower link which is connected to the other end of the upper link through an upper pin and also is connected to a crank pin of a crank shaft; and a control link whose one end is rockably supported at an engine body side and whose other end is connected to the lower link through a control pin. Both end portions of the upper pin are supported at a pair of upper-pin pin boss portions formed at one end of the lower link and having a bifurcated shape, and an upper link side pin boss portion of an end portion of the upper link is connected to a middle portion of the upper pin. A lubrication structure of the upper pin in the piston crank mechanism of an internal combustion engine of the present invention comprises: an oil supply hole formed so as to open between the pair of upper-pin pin boss portions of the lower link and supplying lubricating oil, which is supplied from the crank pin, toward the upper pin; an oil storing portion provided between the pair of upper-pin pin boss portions so as to cover a bottom side of the upper link side pin boss portion; and an oil groove recessed on an end surface of the upper link side pin boss portion from an outer circumferential surface to an inner circumferential bearing hole of the upper link side pin boss portion.

With this configuration, the lubricating oil supplied from the crank pin toward the upper pin through the oil supply hole of the lower link is stored in the oil storing portion, and relative oscillating rotary motion of the upper link side pin boss portion is made with the upper link side pin boss portion at least partly sinking below or touching the stored lubricating oil. The lubricating oil is supplied in the oil storing portion in a measure of pressurized state, and spills over from the oil storing portion successively. By the oscillating rotary motion of the upper link side pin boss portion is made in such lubricating oil, a part of the lubricating oil flows to the inner circumferential bearing hole through the oil groove formed on the end surface of the upper link side pin boss portion, and sliding parts between the upper link side pin boss portion and the upper pin are lubricated.

Therefore, continuous oil supply to the upper pin and continuous lubrication of the upper pin can be achieved.

BRIEF DESCRIPTION OF DRAWINGS

FIG. 13A is a drawing for explaining a position of the oil groove in a low compression ratio state. FIG. 13B is a drawing for explaining a position of the oil groove in a high compression ratio state.

EMBODIMENTS FOR CARRYING OUT THE INVENTION

In the following description, embodiments of the present invention will be explained with reference to the drawings.

Figure 1:
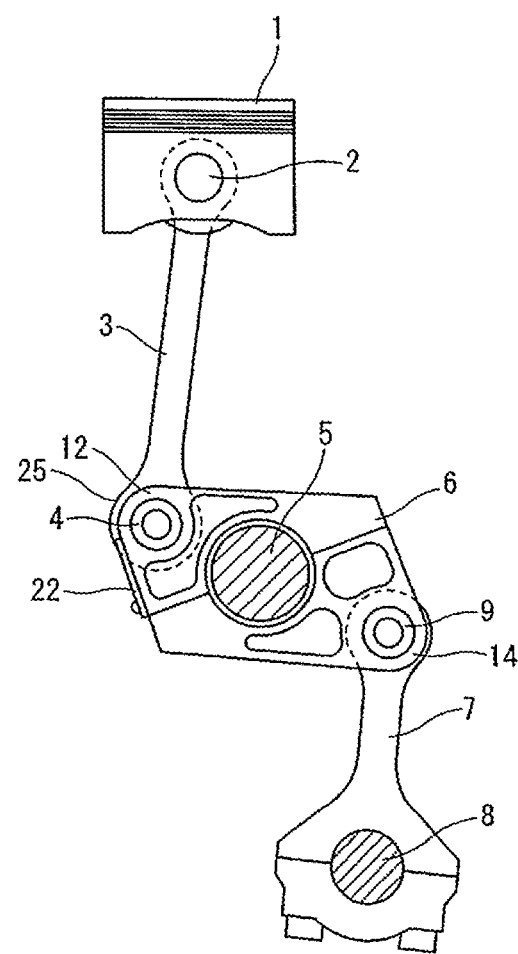
FIG. 1 is a drawing for explaining a multi-link piston crank mechanism of an embodiment.

FIG. 1 shows components of a multi-link piston crank mechanism to which the present invention is applied. This multi-link piston crank mechanism itself is known by the above-mentioned Patent Document 1 etc. The multi-link piston crank mechanism has an upper link 3 whose one end is connected to a piston 1 through a piston pin 2, a lower link 6 which is connected to the other end of this upper link 3 through an upper pin 4 and also is connected to a crank pin 5 of a crank shaft, and a control link 7 which limits degree of freedom of this lower link 6. One end of the control link 7 is rockably supported by a supporting pin 8 at an engine body side, and the other end of the control link 7 is connected to the lower link 6 through a control pin 9. Here, by variably positioning the supporting pin 8, the multi-link piston crank mechanism can also act as a variable compression ratio mechanism.

Figure 2:
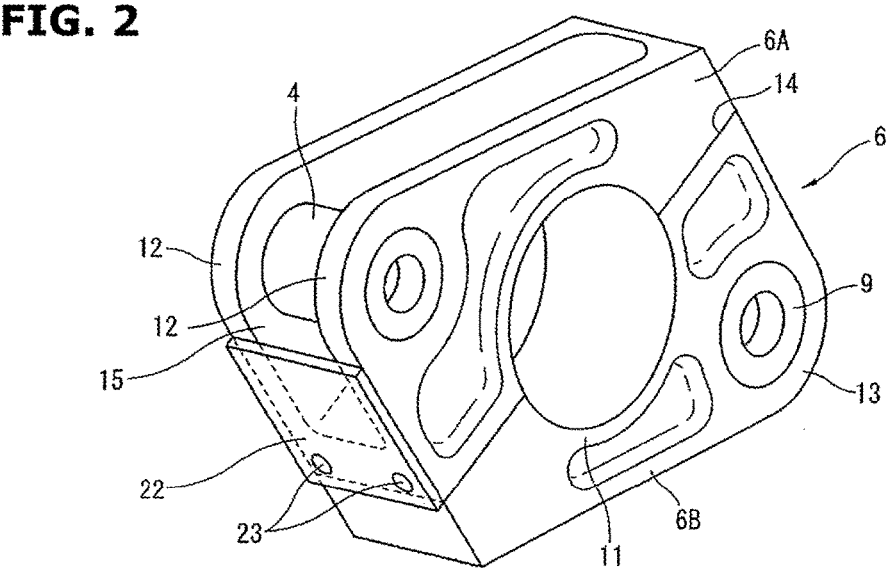
FIG. 2 is a perspective view of a lower link of the embodiment.
Figure 3:
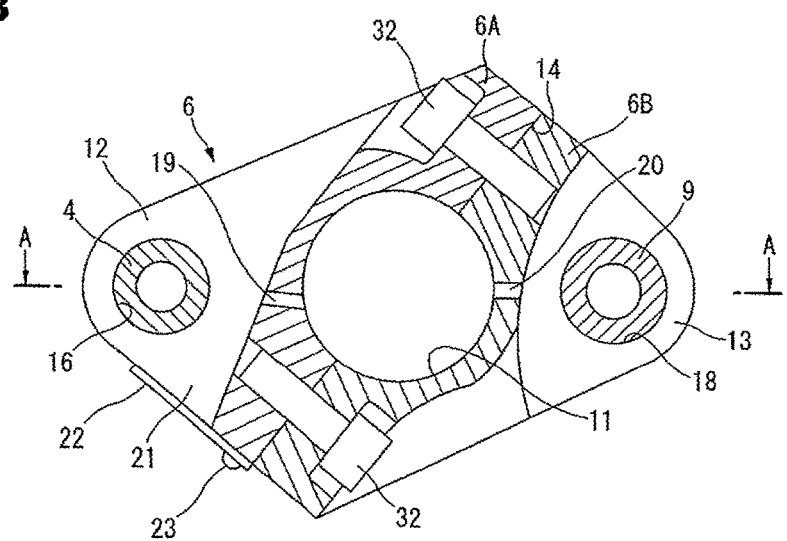
FIG. 3 is a sectional view of the lower link of the embodiment.
Figure 4:
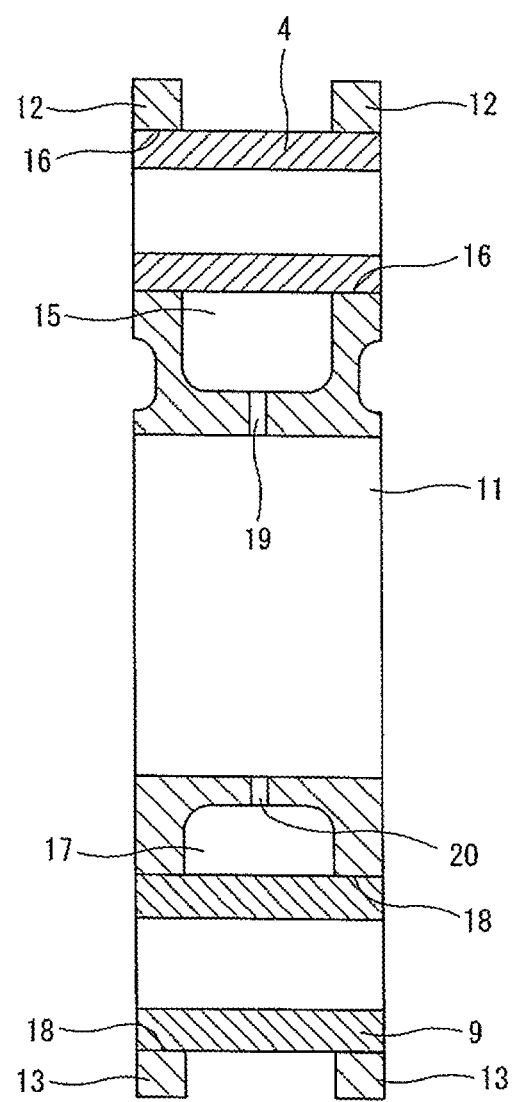
FIG. 4 is a sectional view taken along a A-A line of FIG. 3.

As shown in FIGS. 2 to 4, the lower link 6 has, in the middle thereof, a cylindrical crank pin bearing portion 11 in which the crank pin 5 is fitted or inserted. The lower link 6 also has, at substantially 180° opposite sides of the crank pin bearing portion 11, an upper-pin pin boss portion 12 and a control-pin pin boss portion 13. The lower link 6 as a whole is shaped into a parallelogram that is near to a rhombus. The lower link 6 is formed by two divided members of a lower link upper 6A including the upper-pin pin boss portion 12 and a lower link lower 6B including the control-pin pin boss portion 13 with a dividing surface 14 passing through a center of the crank pin bearing portion 11 being a boundary. These lower link upper 6A and lower link lower 6B are tightened together with a pair of bolts 32 that are inserted in opposite directions each other after the crank pin is fitted or inserted into the crank pin bearing portion 11.

The upper-pin pin boss portion 12 is shaped into a bifurcated shape so as to sandwich the upper link 3 at an axial direction middle portion, and each of a pair of upper-pin pin boss portion 12 that support both end portions in the axial direction of the upper pin 4 extends along an end surface in an axial direction of the lower link 6 (see FIG. 4). That is, a groove portion 15 having a certain width by which a rockable movement of the upper link 3 can be possible is provided between the pair of upper-pin pin boss portion 12. Each of the upper-pin pin boss portion 12 has a circular pin fitting hole 16, and the upper pin 4 is press-fitted into these pin fitting holes 16. In FIGS. 2 to 4, although the lower link 6 is illustrated together with the upper pin 4, an actual press-fitting working of the upper pin 4 is carried out when the upper link 3 is connected to the lower link 6.

The control-pin pin boss portion 13 basically has the same structure as that of the upper-pin pin boss portion 12. The control link 7 is connected to or put in a groove portion 17 between a pair of control-pin pin boss portion 13 having a bifurcated shape, and the control pin 9 is press-fitted into pin fitting holes 18 of the control-pin pin boss portion 13 at both end portions of the control pin 9.

The crank pin bearing portion 11 is a bearing portion that is fitted onto the crank pin 5 through a half bearing metal (not shown). Here, in the present embodiment, oil supply holes 19 and 20 are formed at the crank pin bearing portion 11 so as to penetrate the crank pin bearing portion 11 so that lubricating oil is supplied from the crank pin 5 side and is supplied toward the upper pin 4 and the control pin 9. These oil supply holes 19 and 20 are positioned at substantially middle portions in an axial direction of the crank pin bearing portion 11, and are formed along substantially radial direction.

At the upper-pin pin boss portion 12, a rectangular plate member 22 is fixed to an outer side surface of the lower link 6 so that an oil storing portion 21 (see FIG. 3) that temporarily stores the lubricating oil supplied from the oil supply hole 19 is formed at a lower portion of the groove portion 15. In the present embodiment, since the outer side surface of the lower link 6 where a lower end of the groove portion 15 is positioned is flat (in other words, a lower edge of the upper-pin pin boss portion 12 is flat), as the plate member 22, a flat rectangular plate, such as a metal plate made of, e.g. steel or aluminium alloy, and a hard synthetic resin plate, is used. The plate member 22 is secured to the lower link 6 (the lower link upper 6A) with a pair of screws 23.

Figure 5A:
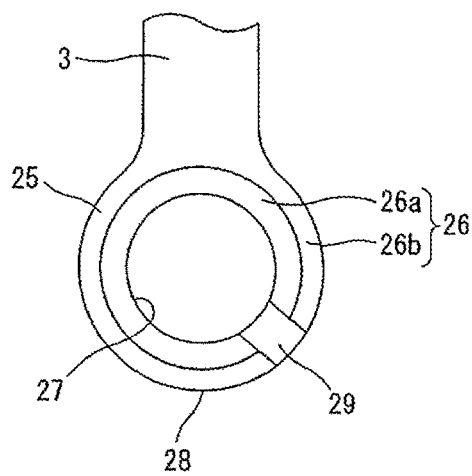
FIG. 5A is a front view of an upper link side pin boss portion.
Figure 5B:
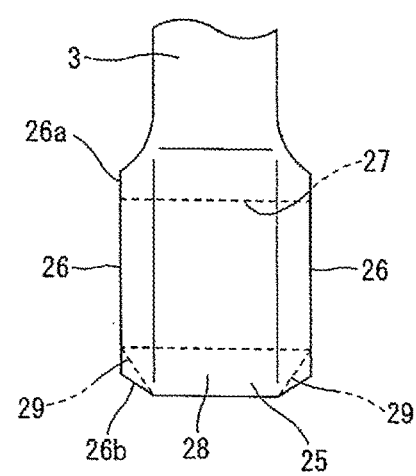
FIG. 5B is a side view of the upper link side pin boss portion.

The upper link 3 connecting to the lower link 6 is shaped into a rod shape made of carbon steel by forging etc. The upper link 3 has, as an integral part, a cylindrical upper link side pin boss portion 25 at an end portion of the upper link 3, which is rotatably (pivotably) fitted onto the upper pin 4. FIGS. 5A and 5B show details of the upper link side pin boss portion 25. As shown in FIGS. 5A and 5B, the upper link side pin boss portion 25 is formed into a substantially cylindrical shape (or tubular shape) by axial direction both end surfaces 26 that face to inner side surfaces of the pair of upper-pin pin boss portion 12, a bearing hole 27 into which the upper pin 4 is inserted through a bearing metal (not shown), and an outer circumferential surface 28. The end surface 26 is formed from a ring-shaped flat surface portion 26a located at an inner circumferential side and encircling the bearing hole 27 and a tapered portion 26b located at an outer circumferential side of the flat surface portion 26a. The flat surface portion 26a is finished by machining, while the tapered portion 26b has a roughened surface by the forging. Each of the end surfaces 26 is provided with an oil groove 29 that is recessed along a radial direction from the outer circumferential surface 28 to the bearing hole 27. This oil groove 29 is formed throughout both of the tapered portion 26b and the flat surface portion 26a. A position in a circumferential direction of the oil groove 29 is the crank pin 5 side, i.e. a side facing to the oil supply hole 19. A gap existing between the end surface 26 and the inner side surface of the upper-pin pin boss portion 12 is set to be relatively small.

Figure 6:
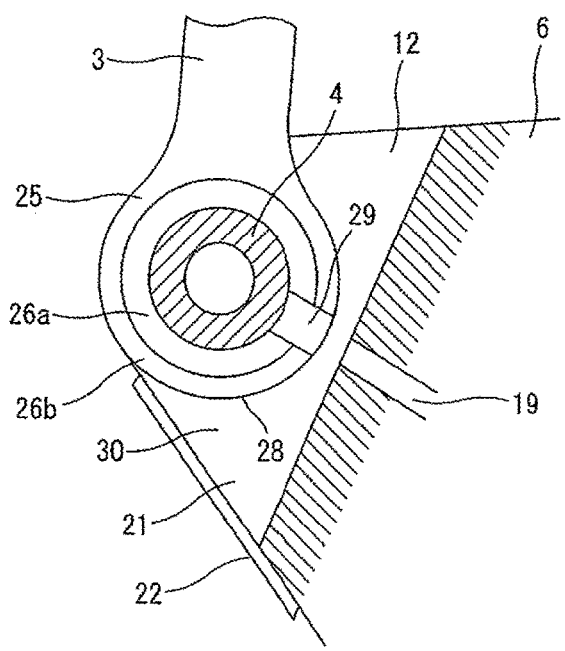
FIG. 6 is a drawing for explaining an essential part in a state in which an upper link is connected to the lower link.
Figure 7:
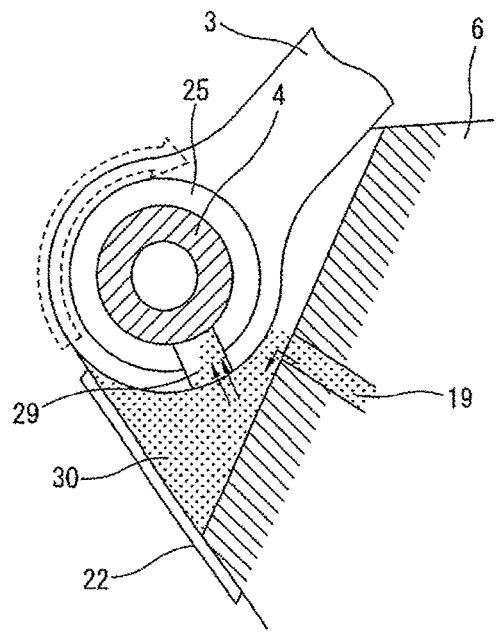
FIG. 7 is a drawing for explaining a flow of lubricating oil.

FIG. 6 is a sectional view for explaining an essential part in a state in which the upper link 3 formed as described above and the lower link 6 are connected through the upper pin 4. FIG. 7 is a drawing for explaining a flow of the lubricating oil in this essential part.

The lubricating oil pressurized by an oil pump (not shown) of an internal combustion engine is supplied to sliding surfaces between the crank pin 5 and the lower link 6 (the crank pin bearing portion 11) in each cylinder through a lubricating oil passage (not shown) inside the crank shaft from a main gallery in a cylinder block. A part of the lubricating oil is supplied toward the upper link side pin boss portion 25 and the upper pin 4 through the oil supply hole 19 of the lower link 6, then the lubricating oil is stored in the oil storing portion 21 located at a lower side of the upper link side pin boss portion 25.

As shown in the drawings, the oil storing portion 21 is formed so as to cover or accommodate a bottom side of the upper link side pin boss portion 25 from a lower side. Then, the lubricating oil supplied in a pressurized state fills a space 30 that is formed between the oil storing portion 21 and the upper link side pin boss portion 25, and spills over from the space 30 successively. At least a part of the outer circumferential surface 28 of the upper link side pin boss portion 25 touches or is contiguous with the lubricating oil filling the space 30. In this state, relative oscillating rotary motion of the upper link side pin boss portion 25 is made by and according to a rocking movement of the lower link 6.

Therefore, by the fact that the oscillating rotary motion of the upper link side pin boss portion 25 is made with the oil groove 29 of the end surface 26 of the upper link side pin boss portion 25 at least partly sinking below the lubricating oil, and also by a measure of pressurized state of the lubricating oil in the space 30, the lubricating oil is introduced to an inner circumferential side through the oil groove 29, and supplied to sliding surfaces between the upper pin 4 and the upper link side pin boss portion 25. Since the end surface 26 of the upper link side pin boss portion 25 is formed from the ring-shaped flat surface portion 26a encircling the bearing hole 27 and the tapered portion 26b located at the outer circumferential side of the flat surface portion 26a and the oil groove 29 is formed so as to be recessed throughout both of the tapered portion 26b and the flat surface portion 26a as mentioned above, the lubricating oil easily flows into the oil groove 29 through the tapered portion 26b, and the lubricating oil is surely introduced to the upper pin 4 side. Such oil supply and lubricating function are continuously made regardless of a stroke position of the piston 1. A connecting part between the upper pin 4 and the upper link 3, on which a large combustion load acts, can therefore be lubricated surely and adequately.

Here, although a relative position relationship between the oil groove 29 and the oil supply hole 19 is changed in some degree according to an attitude of the rocking lower link 6 etc. it is desirable that, basically, as shown in FIG. 6, the oil supply hole 19 be set so as to face to the oil groove 29. With this setting, the oil supply to the upper pin 4 side can be easily made through the oil groove 29 also by a flow itself of the lubricating oil injected from the oil supply hole 19.

Next, some modified examples in which a part of the above embodiment is changed will be explained.

Figure 8:
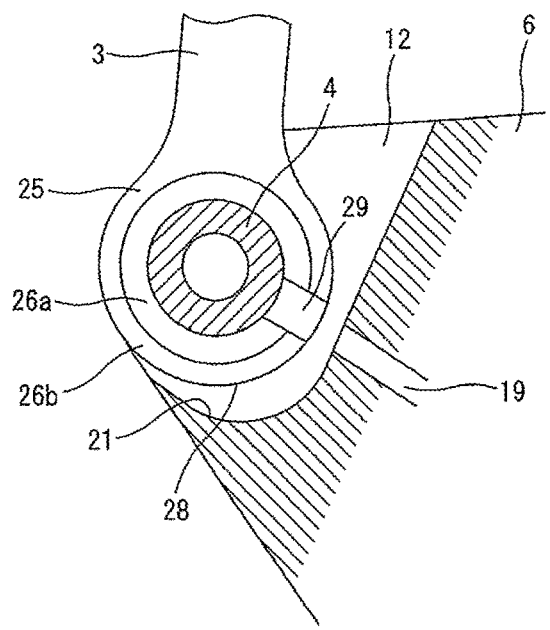
FIG. 8 is a drawing for explaining an essential part in an embodiment in which an oil storing portion is formed at the lower link itself.

FIG. 8 shows an embodiment in which the oil storing portion 21 is formed integrally with the lower link 6 itself without using the plate member 22 that is an additional member. That is, a bottom end of the groove portion 15 between the pair of upper-pin pin boss portion 12 of the lower link 6 is formed into a closed shape having a substantially U-shape. With this shape, the oil storing portion 21 that encloses the bottom side portion of the upper link side pin boss portion 25 is formed.

Figure 9:
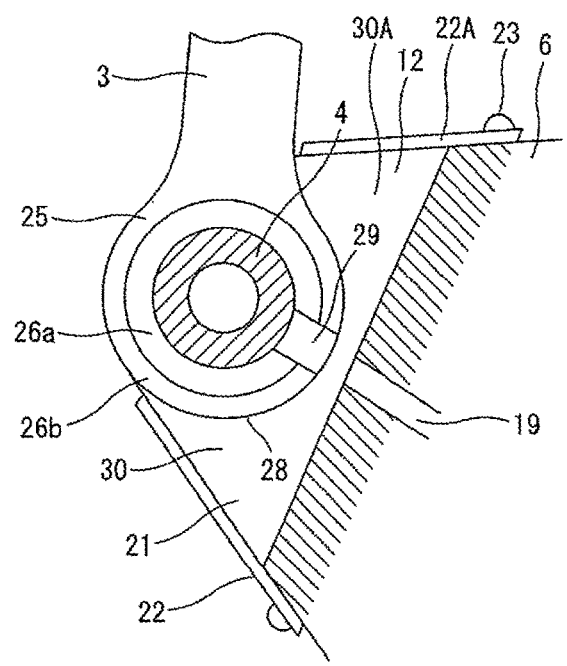
FIG. 9 is a drawing for explaining an essential part in an embodiment in which upper and lower ends of a groove portion are closed.

FIG. 9 shows an embodiment in which a second plate member 22A is further provided on an upper surface of the lower link 6, and a top end of the groove portion 15 is closed. In the same manner as the plate member 22 at the lower side of the lower link 6, the second plate member 22A is secured to the lower link 6 (the lower link upper 6A) with a pair of screws 23. Therefore, in the present embodiment, the lubricating oil supplied through the oil supply hole 19 fills both of the space 30 located at the lower side of the upper link side pin boss portion 25 and an upper side space 30A, and is easily introduced to the upper pin 4 side through the oil groove 29.

Figure 10:
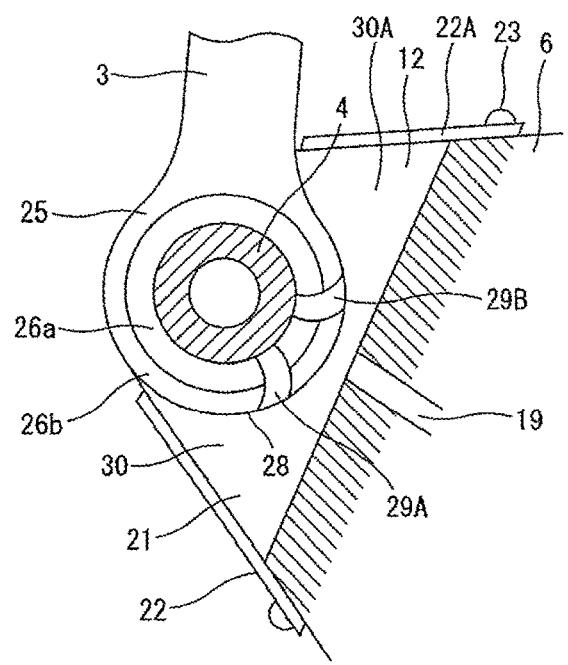
FIG. 10 is a drawing for explaining an essential part in an embodiment in which a pair of oil grooves are formed into a curved shape.

Next, FIG. 10 shows an embodiment in which a shape of the oil groove 29 is changed. That is, in the present embodiment, a pair of oil grooves 29A and 29B are provided on the end surface of the upper link side pin boss portion 25. These oil grooves 29A and 29S are formed into a curved shape like a substantially arc which is inclined with respect to a line of radius of the upper link side pin boss portion 25. In particular, each of the oil grooves 29A and 29S is formed so as to be inclined to respective directions in which a component of velocity to a radial direction inner circumferential side is generated in the oil grooves 29A and 29B by and according to relative rotation (pivotal movement) of the upper link side pin boss portion 25 with respect to the oil storing portion 21. More specifically, when the upper link side pin boss portion 25 rotates (pivots) in a clockwise direction in FIG. 10, the lubricating oil is taken in the inner circumferential side through the oil groove 29A that is one of the oil grooves. When the upper link side pin boss portion 25 rotates (pivots) in a counterclockwise direction in FIG. 10, the lubricating oil is taken in the inner circumferential side through the oil groove 29B that is the other of the oil grooves. Here, the drawing illustrates an example in which this upper link side pin boss portion 25 is combined with a configuration of the lower link 6 having the second plate member 22A shown in FIG. 9. However, this upper link side pin boss portion 25 could be combined with a configuration of the lower link 6 not having the second plate member 22A as shown in FIGS. 6 and 8.

Figure 11:
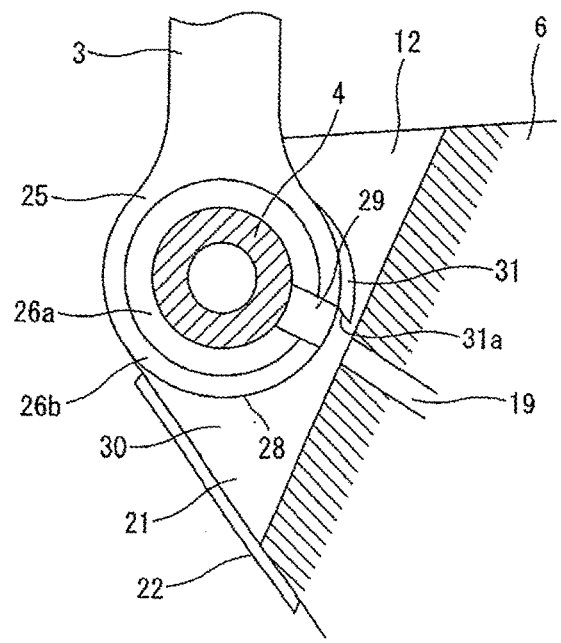
FIG. 11 is a drawing for explaining an essential part in an embodiment in which a protruding portion is formed adjacent to an opening of the oil groove.

FIG. 11 shows an embodiment in which a protruding portion 31 that guides the lubricating oil into the oil groove 29 is provided on the outer circumferential surface 28 of the upper link side pin boss portion 25. The protruding portion 31 is disposed, in particular, at an opposite side to the oil storing portion 21 with the protruding portion 31 being adjacent to an opening at an outer circumferential side of the oil groove 29. When the upper link side pin boss portion 25 rotates (pivots) in a clockwise direction in FIG. 11, the protruding portion 31 added to the upper link side pin boss portion 25 pushes or squeezes the lubricating oil filling the space 30 (in other words, the oil storing portion 21), and guides the lubricating oil into the oil groove 29 along a tip edge 31a of a rotation direction (pivotal direction).

Figure 12:
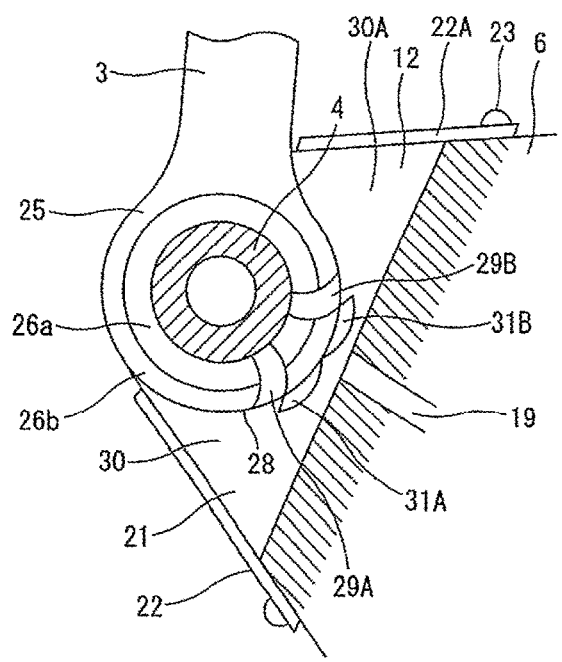
FIG. 12 is a drawing for explaining an essential part in an embodiment in which a pair of oil grooves and a pair of protruding portions are formed.

FIG. 12 shows an embodiment in which protruding portions 31A and 31B are further added to the two curved oil grooves 29A and 29B shown in FIG. 10. The protruding portions 31A and 31B are arranged so as to be symmetrical with respect to each other according to inclinations of the oil grooves 29A and 29B. When the upper link side pin boss portion 25 rotates (pivots) in a clockwise direction, the protruding portion 31A that is one of the protruding portions guides the lubricating oil into the oil groove 29A. When the upper link side pin boss portion 25 rotates (pivots) in a counterclockwise direction, the protruding portion 31B that is the other of the protruding portions guides the lubricating oil into the oil groove 29B.

FIGS. 13A and 13B show a modified example concerning a position of the oil groove 29. In the present embodiment, the position of the oil groove 29 is set to be within a range of the oil storing portion 21 when the piston 1 is positioned close to a top dead center (i.e. when the attitude of the lower link 6 is greatly tilted or inclined so that the upper pin 4 side is located at a higher position). Especially in a case where the multi-link piston crank mechanism is configured as the variable compression ratio mechanism by variably positioning the supporting pin S provided at a base end of the control link 7 as disclosed in Patent Document 1, the position of the oil groove 29 is selected so as to be within the range of the oil storing portion 21 in both states of a low compression ratio state shown in FIG. 13A and a high compression ratio state shown in FIG. 13B.

In such configuration, the supply of the lubricating oil to the upper pin 4 is surely carried out at a point close to the top dead center at which the combustion load is input to the upper pin 4.

The invention claimed is:

1. A lubrication structure of an upper pin in a piston crank mechanism of an internal combustion engine,
    wherein the piston crank mechanism includes:
        an upper link whose one end is connected to a piston through a piston pin;
        a lower link which is connected to the other end of the upper link through the upper pin and also is connected to a crank pin of a crank shaft; and
        a control link whose one end is rockably supported at an engine body side and whose other end is connected to the lower link through a control pin,
    wherein both end portions of the upper pin are supported at a pair of upper-pin pin boss portions formed at one end of the lower link and having a bifurcated shape, and an upper link side pin boss portion of an end portion of the upper link is connected to a middle portion of the upper pin,
the lubrication structure comprising:
    an oil supply hole formed so as to open between the pair of upper-pin pin boss portions of the lower link and supplying lubricating oil, which is supplied from the crank pin, toward the upper pin;
    an oil storing portion provided between the pair of upper-pin pin boss portions so as to cover a bottom side of the upper link side pin boss portion; and
    an oil groove recessed on an end surface of the upper link side pin boss portion from an outer circumferential surface to an inner circumferential bearing hole of the upper link side pin boss portion.

2. The lubrication structure of the upper pin in the piston crank mechanism of the internal combustion engine as claimed in claim 1, wherein:
    the oil storing portion is formed by a plate member being fixed to the lower link so as to cover a lower end of a groove portion that is formed between the pair of upper-pin pin boss portions.

3. The lubrication structure of the upper pin in the piston crank mechanism of the internal combustion engine as claimed in claim 1, wherein:
    the oil storing portion is formed integrally with the lower link such that a lower end of a groove portion that is formed between the pair of upper-pin pin boss portions is a closed shape.

4. The lubrication structure of the upper pin in the piston crank mechanism of the internal combustion engine as claimed in claim 1, wherein:
    the end surface of the upper link side pin boss portion is formed from a ring-shaped flat surface portion located at an inner circumferential side and encircling the bearing hole and a tapered portion located at an outer circumferential side of the flat surface portion, and
    the oil groove is formed throughout both of the tapered portion and the flat surface portion.

5. The lubrication structure of the upper pin in the piston crank mechanism of the internal combustion engine as claimed in claim 1, wherein:
    the oil groove is formed so as to be inclined with respect to a line of radius of the upper link side pin boss portion to a direction in which a component of velocity to a radial direction inner circumferential side is generated according to relative rotation of the upper link side pin boss portion with respect to the oil storing portion.

6. The lubrication structure of the upper pin in the piston crank mechanism of the internal combustion engine as claimed in claim 1, wherein:
    a protruding portion that guides the lubricating oil into the oil groove is provided on the outer circumferential surface of the upper link side pin boss portion with the protruding portion being adjacent to an outer circumferential side end edge of the oil groove.

7. A lubrication method of an upper pin in a piston crank mechanism of an internal combustion engine,
    wherein the piston crank mechanism includes:
        an upper link whose one end is connected to a piston through a piston pin;
        a lower link which is connected to the other end of the upper link through the upper pin and also is connected to a crank pin of a crank shaft; and
        a control link whose one end is rockably supported at an engine body side and whose other end is connected to the lower link through a control pin,
    wherein both end portions of the upper pin are supported at a pair of upper-pin pin boss portions formed at one end of the lower link and having a bifurcated shape, and an upper link side pin boss portion of an end portion of the upper link is connected to a middle portion of the upper pin,
the lubrication method comprising:
    pumping lubricating oil from the crank pin to a space formed between an oil storing portion enclosing a bottom side of the upper link side pin boss portion and the upper link side pin boss portion through an oil supply hole provided at the lower link, and storing the lubricating oil such that at least a part of the upper link side pin boss portion touches the lubricating oil; and
    introducing the lubricating oil to a bearing hole located at an inner circumferential side of the upper link side pin boss portion through an oil groove recessed on an end surface of the upper link side pin boss portion.

* * * * *